United States Patent [19]
Best

[11] 3,792,574
[45] Feb. 19, 1974

[54] HAY ROLLING MACHINE WITH COMPRESSING MEANS
[75] Inventor: Albert M. Best, New Holland, Pa.
[73] Assignee: Sperry Rand Corporation, New Holland, Pa.
[22] Filed: Dec. 7, 1972
[21] Appl. No.: 313,038

[52] U.S. Cl.................................. 56/341, 56/16.4
[51] Int. Cl............................................ A01d 39/00
[58] Field of Search................. 56/1, 16.4, 341–343

[56] References Cited
UNITED STATES PATENTS
3,650,100   3/1972   Swan..................................... 56/341
3,110,145   11/1963   Avery ......................................... 56/1
3,587,218   6/1971   Geary .................................. 56/343

3,680,296   8/1972   Beebout.............................. 56/16.4

Primary Examiner—Russell R. Kinsey
Attorney, Agent, or Firm—C. Hercus Just; Frank A. Seemar; Joseph A. Brown

[57] ABSTRACT

A hay rolling machine adapted to form rolls of hay from a swath or windrow thereof in partially cured condition while lying on a field to form a roll of hay of substantial size and weight as the machine is drawn along the field by a tractor or otherwise. A positively driven roll is mounted on the machine to engage the roll of hay being formed for purposes of (1) facilitating movement of the roll of hay and (2) compacting the roll of hay be gravity imposing the weight of the driven roll upon the roll of hay.

14 Claims, 4 Drawing Figures

3,792,574

HAY ROLLING MACHINE WITH COMPRESSING MEANS

BACKGROUND OF THE INVENTION

Historically, for many years, hay of various kinds and other forage crops have notoriously been harvested by cutting the crop, letting it lie in the sun upon a field to at least partially dry and cure, arranging the same in windrows, and then picking up the windrows and feeding the same to hay balers which form compact bales of predetermined size which, at least in general, have a weight which can be handled manually. Such bales then are either hauled to storage sheds or barns to store the hay until used in relatively weatherproof conditions. Such operations require a substanial amount of manpower and the manpower is becoming increasingly costly and scarce in farming operations.

To minimize the amount of manpower required for haying operations of the ype described above, there has developed in very recent years a hay harvesting technique in which a swath or windrow of hay is engaged by suitable machines to roll a strip or swath of such hay of substanial width, such as of the order of 6 ft., for example, into a coiled roll of substanial diameter such as, for example, 4 ft. A roll of hay of such size is far too heavy for manual handling and thus the practice has developed of letting rolls of hay of such type as described remain in a grazing or feeding field or feed lot for cattle to gradually feed upon. Due to the curved upper surface of such bales, it has been found that they readily shed rain and thus do not unduly deteriorate while remaining in a field, even in uncovered condition.

One of the problems involved in forming rolls of hay of the type described is that machines of the type presently devised do not have adequate facility to produce rolls of the desired degree of compactness or, machines which effect adequate compactness are very expensive and complex, whereby it is only a farm of substanial size, operating with large herds of cattle, that can afford machines of the latter type economically.

Referring to several machines which have been developed heretofore to form rolls of hay, attention is directed to patent No. 3,110,145, issued Nov. 12, 1963 to P. J. Avery. The hay bailing apparatus illustrated therein forms rolls of hay of large diameter and reasonable length by utilizing a pair of chains of substanial length upon which projecting slats or strips which engage a progressively enlarging roll of hay and compensate for the increasing diameter by permitting the chains to adjust position due to being mounted upon pivoted arms which move against the action of heavy springs or ultimately are unlatched to accommodate the chains and the slats thereon to the roll of hay which ultimately is discharged from the machine. Maintaining such chains and slats as well as the supporting and tensioning mechanism in operative condition present certain difficulties, in addition to rendering a machine of such type relatively expensive.

U.S. Pat. No. 3,650,100, issued Mar. 21, 1972, to Sherman Swan, pertains to a machine for forming rolls of hay of a highly complex and expensive nature and includes certain attempts to, compress the rolls of hay formed by said machine through the use of suspended chains and compressing frame which ultimately engages a roll of relatively large diameter. The complexity and relatively high cost of a machine of the type shown in this patent, together with the questionable effectiveness of the compressing means places such a machine out of the field of popular use, especially in regard to relatively small farms feeding smaller heards of cattle then the size of farm which can economically support such a machine.

SUMMARY OF THE INVENTION

It is the principal object of the present invention to provide a durable and relatively simple hay rolling machine utilizing mechanical strutures which require minimum maintenance and capable of forming compact rolls of hay of substanial size within the ranges described here and above and including roll-compacting means comprising a positively driven roll mounted in the machine so as to be suspended by gravity to exert weight upon the roll of hay to compress it and the positive driving of the roll facilitating the formation of the roll of hay to augment the hay-pickup unit on the machine.

It is another object of the invention to positively drive the compressing roll at a surface speed slightly in excess of the ground speed of the machine, thereby not only facilitating movement of the roll of hay along the field but also augmenting the compressing effect of the roll by gravity due to the tendency to tension the outermost layer of hay continuously being applied to the roll of hay as it rolls along the field.

It is a further object of the invention to drive the compressing roll of the present invention from one or both of a pair of supporting wheels on the machine by which it is rendered mobile as pulled along a field by a tractor or the like, whereby auxiliary power means, such as a p.t.o. of a tractor are required.

It is still another object of the invention to provide such aforementioned hay roll tensioning means which is capable of long life, yet is relatively inexpensive to manufacture and thus places at the disposal of small farming operations an effective hay rolling machine operable to produce compact rolls of hay comparable with or superior to those formed even by more complex and expensive machines for such purposes.

Details of the foregoing objects and the invention, as well as other objects thereof, are set forth in the following specification and illustrated in the accompanying drawings comprising a part thereof.

DETAILED DESCRIPTION

Figure 4:
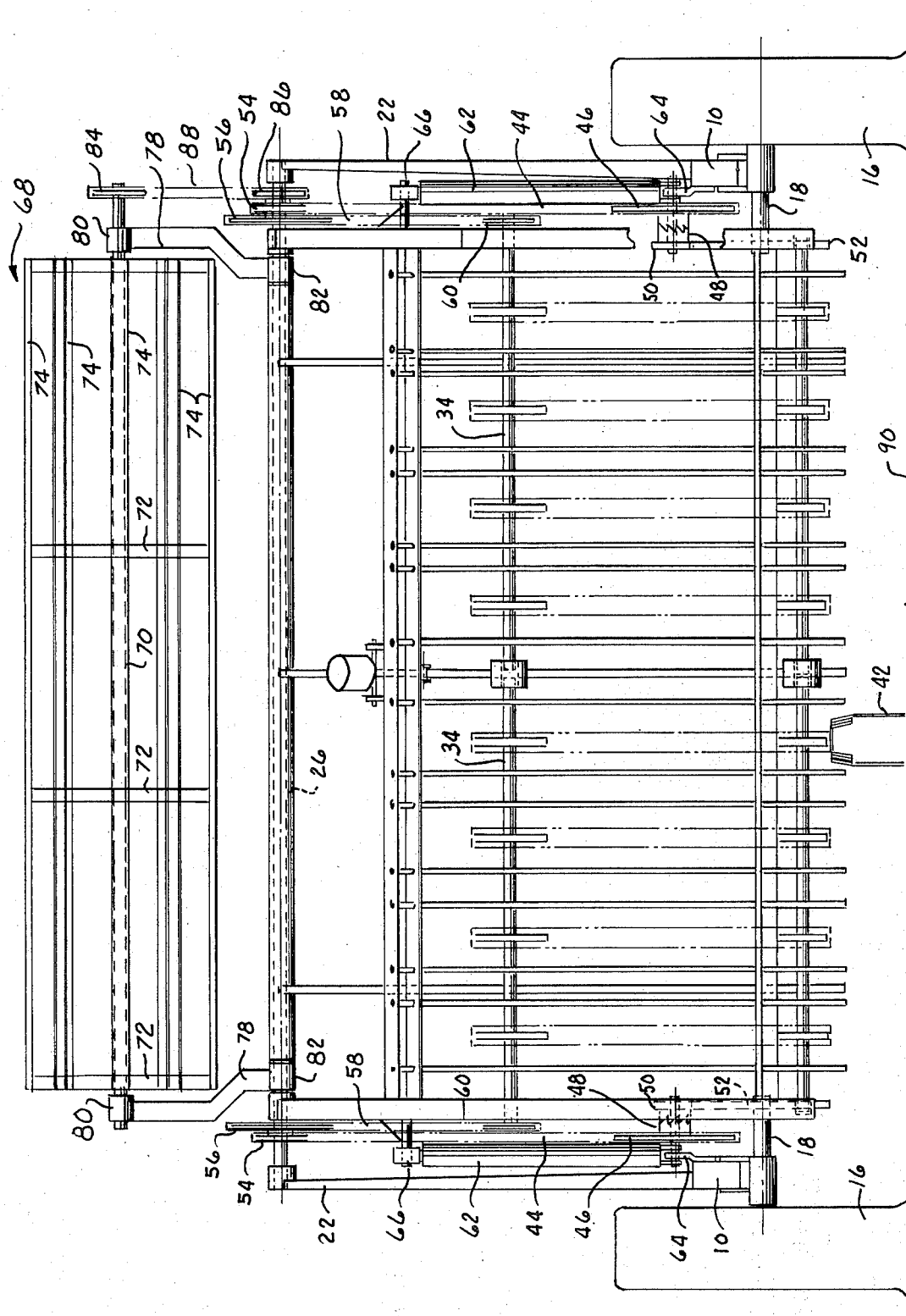
FIG. 4 is a rear elevation of the machine shown in the preceding figures and illustrating the compressing roll in an exaggerated elevated position to show certain details thereof.

The hay rolling machine comprising the present invention includes a base frame 10 which is formed from suitable strutural channels or the like in accordance with conventional design for machines of this type. The forward end of the machine has a tongue 12 including a clevis 14 for connection thereof to a tractor or the like. As shown in FIG. 4, at opposite sides of the machine, a pair of wheels 16 are rotatably supported upon suitable axles. Auxiliary frame members 20 and 22 respectively extend upwardly from the sides of base frame 10 and are connected thereto at longitudinally spaced locations, the upper ends of members 20 and 22 being connected together to provide a bearing 24 to receive opposite ends of an upper shaft 26. Thus, it will be seen that the members 20 and 22 at each side of the frame 10 are somewhat A-shaped to provide effective bracing for support of the shaft 26 and the mechanism supported thereby as described hereinafter. Members 20 and 22 may, for example, be in the form of strutural channels or otherwise.

Figure 1:
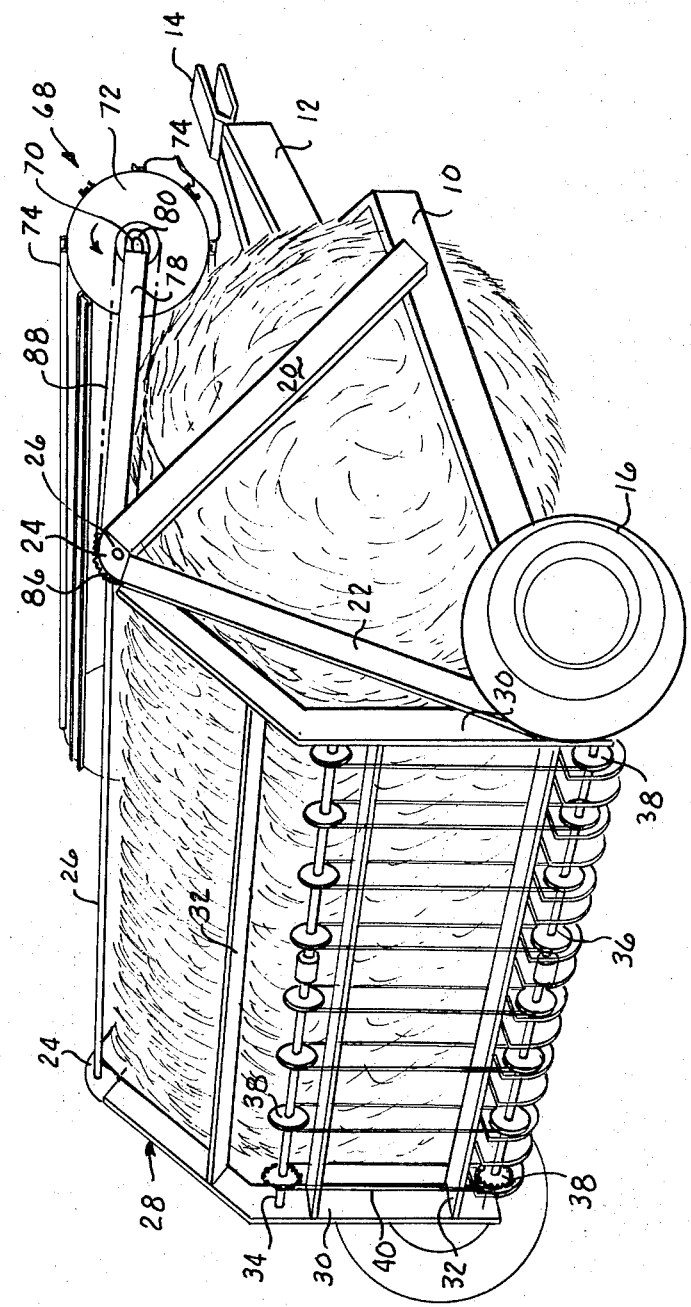
FIG. 1 is a perspective view of a hay rolling machine embodying the principles of the present invention as seen from the rearward end of the machine and showing the compressing roll in exemplary, elevated position.
Figure 2:
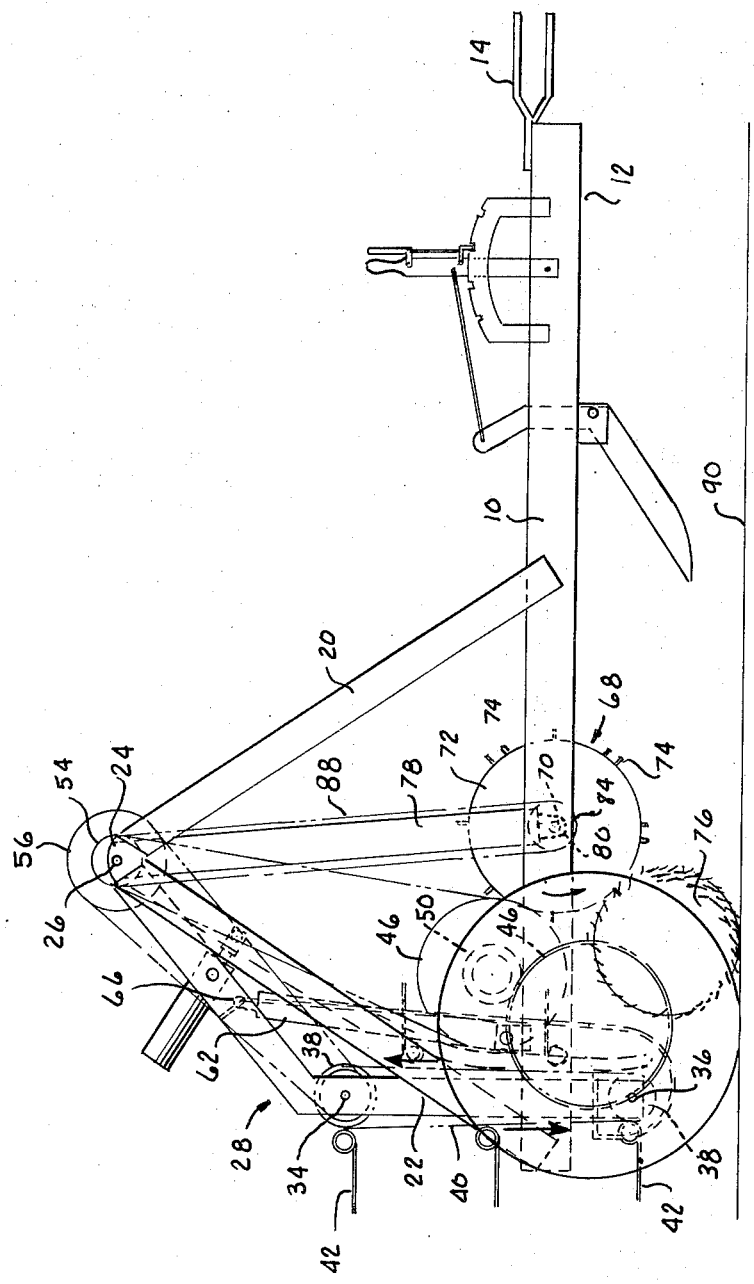
FIG. 2 is a side elevation of the machine shown in FIG. 1 and illustrating the compressing roll in an exemplary starting position such as when a new roll of hay initially is being formed.

A hay pickup unit 28 is supported by shaft 26 for movement between a lower, operative position as shown in FIGS. 1 and 2, and a raised, discharge position as shown in FIGS. In view of the fact that the hay pickup unit 28 comprises part of the invention described and claimed in said aforementioned companion application, only certain functions and details thereof are described and claimed in this application, as follows.

Hay pickup unit 28 comprises a pair of angular side members 30, the upper ends of which are pivotally supported by the shaft 26. A plurality of strut members 32 extend between members 30 to brace the same for the support of a pair of parallel shafts 34 and 36 which respectively support pairs of sprocket gears 38, one of which in each pair is an idler and the other is driven. The pairs of upper and lower sprocket gears support endless sprocket chains 40 upon which a plurality of spring fingers 42 are mounted in longitudinally spaced relationship to each other.

Figure 3:
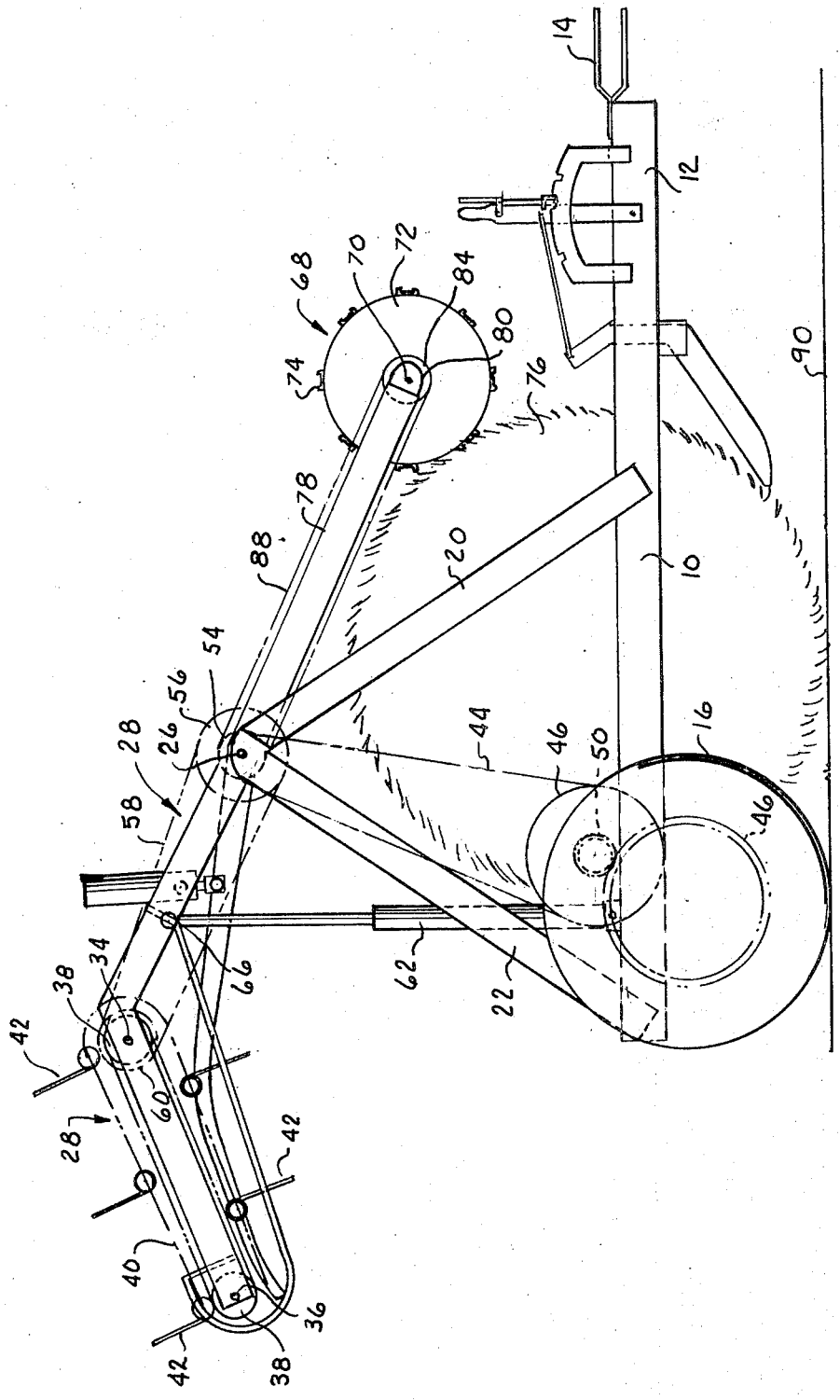
FIG. 3 is a side elevation of the machine shown in FIGS. 1 and 2 but illustrating the compressing roll in elevated position such as when a roll of hay has been formed to desired size and the hay pick-up unit has been elevated to permit discharge of the formed roll from the machine.

The sprocket chains 40 are driven in the direction of the arrows shown in FIG. 2 by a pair of drive chains 44 respectively shown best in FIG. 4 at opposite sides of the machine. The drive chains extend around sprocket gears 46 which are shown in FIGS. 3 and 4. By means of clutches 48, th gears 46 are connected to pinion gears 50 which are driven by drive gears 52 connected to the axles 18 for wheels 16, whereby said wheels drive the sprocket gears 46. Drive chains 44 extend around the sprocket gears 46 and also around drive sprockets 54 on shaft 26.

Drive sprockets 54 also are fixed to larger diameter sprockets 56 which are coaxial with shaft 26 and around which drive chains 58 extend for purposes of driving sprocket gears 60, around which the chains 58 also extend. Gears 60 are connected to shaft 34 upon which the upper sprocket gears 38 are mounted to drive the sprocket chains 40 which extend therearound and by which the spring fingers are moved in the direction of the arrows referred to above in FIG. 2, at about 5 percent faster than ground speed.

Respectively provided at opposite sides of the frame 10 are each of a pair of hydraulic cylinder and piston units 62. One end of the cylinder of said units are connected to brackets 64, see FIG. 4, and the upper end of the pistons are connected to the side members 30 of the hay pickup unit 28 by pivot pins 66, as shown in FIGS. 2-4. Suitable conduits for hydraulic fluid, not shown, are connected to opposite ends of the cylinders 62 to direct fluid under pressure, from the tractor or the like, for actuation of the piston of the unit and thereby move the hay pickup unit 28 between its lowered operative positon, shown in FIGS. 1 and 2, and its raised discharged position shown in FIG. 3.

The present invention primarily is concerned with the compressing roll 68 which is supported by the auxiliary frame members 20 and 22. Roll 68 preferably comprises a horizontal shaft 70 upon which a plurality of disc-like members 72 are fixed in longitudinally spaced relationship. Extending between the members 72 and fixed thereto in evenly circumferentially spaced relationship are a plurality of rib means 74 which, in the preferred construction of the machine, comprise structural channels, as best shown in FIGS. 1-3. The channels 74 are arranged to open outwardly with respect to the supporting member 72, whereby the flanges of the channel provide means to effectively and frictionally engage the exterior surface of a roll 76 of hay being formed, as shown in exemplary manner in FIGS. 2 and 3.

The compressing roll 68 is supported by a pair of links 78 which respectively are located at opposite sides of the machine as clearly shown in FIG. 4. One end of each link has a bearing 80 thereon which respectively receive the opposite ends of shaft 70. The opposite ends of links 70 have bearings 82 thereon which, as best shown in FIG. 2, receive and are supported by the shaft 26 at the top of the auxiliary frame members 20 and 22.

The compressing roll 68 depends by gravity from the shaft 26. The initial or starting position thereof relative to frame members 20 and 22 is as shown in FIG. 2, such as when a new roll of hay 76 initially is being formed and has a small diameter. Initial pick-up of the swath to form roll 76 is effected primarily by operation of the hay pickup unit 28 as can be visualized from FIG. 2. The driven compressing roll 68 however also facilitates the initial rolling of the hay roll 76 and thereby augments the operation of the pickup unit 28 due to the fact that the compressing roll 68 is positively driven in the direction of the arrows shown on the roll 68 in FIGS. 1-3. Such driving is performed by a sprocket gear 84, best shown in FIGS. 2 and 4, which is connected to one end of shaft 70. A driving sprocket gear 86 is fixed to driven shaft 26, whereby the sprocket gear 86 is powered by means of the supporting wheels 16 for the machine as the same moves along a field. A sprocket chain 88 extends around the sprocket gears 84 and 86 for purposes of rotating shaft 74 and thus postively driving the compressing roll 68. However, one of the preferred features for driving the compressing roll 68 is that the diameters of the sprocket gears 84 and 86 are selected so that the surface speed of the periphery of roll 68 is slightly greater, such as of the order of about 10 percent, for example, than the ground speed at which the hay rolling machine moves relative to the field which is illustrated in exemplary manner by the line 90 in FIGS. 2 and 3.

As a result of the greater surface speed of the compressing roll 68, it will be seen that the engagement of the rib means 74 with a roll of hay 76, as it is formed, will tend to place the outermost layer under tension, as it continues to be formed, and thus tend to tighten and compress the roll 76, in addition to the further functions of at least, in the initial formation of the roll 76, augmenting the rolling function of the hay pickup unit 28 and, in addition, further affording compressing action upon the roll of hay 76, as formed, due to the operation of gravity by which the entire weight of the compressing roll 68 and its supporting link 78 is imparted to the upper surface of the roll 76 as it is being formed.

After a roll of hay 76 has been formed to the desired diameter, either as controlled by observation of the operator of the tractor, or otherwise, the cylinder and piston units 62 are energized to elevate the hay pickup unit 28 and raise it to the position shown in FIG. 3, whereupon the hay rolling machine may move forwardly and disengage the formed roll 76 due to the fact that the rearend of the frame 10 is open and, in plan view, preferably is U-shaped. If desired, when this occurs, the clutches 48 may be disengaged, by means, not shown, but controlled, either manually or automatically, as desired, so as to discontinue the driving of the compressing roll 68 and thereby possitively insure complete disengagement of the hay rolling machine from the formed roll 76. As the machine moves away from the formed roll, the compressing roll 68, by force of gravity, will be lowered from its higher position shown in FIG. 3 to its initial, lowered and freely suspended position shown in FIG. 2. In this position, the compressing roll is ready to cooperate with the hay pickup unit 28, when the same is restored by operation of the cylinder and piston unit 62 to the lower position thereof shown in FIG. 2. Reengagement of the clutch units 48 restores both the hay pickup unit 28 and compressing roll 68 positively to driven condition as the hay rolling machine moves forwardly over a field 90 for the formation of successive rolls of hay 76.

From the foregoing, it will be seen that the relatively simple mechanism comprising the compressing roll 68 as well as its supporting an actuating mechanism is highly effective to facilitate the hay pickup function of the pickup unit 28, augment the rolling of the hay roll 76 along a field due to the greater surface speed of the roll 68 as compared with the ground speed, as described above, and also impart not only tension to the outermost layers of hay on the roll 76, as formed, as well as impart compressive forces induced by gravity through pressure of the roll 68 upon the upper surface of the hay roll 76. Such mechanism can be included in a hay rolling machine at relatively little cost and requires only minimum maintance, whereby the same is highly suited for use not only by relatiavely large farm operations but particularly by relatively small size farm operations due to the economies provided not only from the standpoint of original cost but freedom from complex and expensive power means.

While the invention has been described and illustrated in its several preferred embodiments, it should be understood that the invention is not to be limited to the precise details herein illustrated and described since the same may be carried out in other ways falling within the scope of the invention as illustrated and described. Further, while the foregoing description has referred to "hay," it is to be understood that the invention also is applicable to other similar agricultural crops capable of being rolled into a bale.

I claim:

1. A machine to form rolls of hay and the like from a swath or windrow thereof lying in a field and comprising in combination, a frame, wheels mounted at opposite sides of said frame to render the same mobile to move along a field, hay rolling means on said frame adjacent the normally rear end thereof movably supported and engageable with a swath or windrow of partially cured hay and the like to roll the same in the direction of movement of the machine to form a coiled roll of siad hay and the like, a roll means extending transversely between the sides of said frame, and means rotatably supporting said roll means forwardly of said hay rolling means for operation by gravity to rotatably engage a roll of hay and the like being formed and compress the same as it is rolled along a field.

2. The hay rolling machine according to claim 1 further including means to positively drive said roll means to move the periphery thereof in the same direction as the periphery of the roll of hay and the like being formed.

3. The hay rolling machine according to claim 2 in which said drive means is connected to at least one of said wheels on said frame to be powered thereby for said positive drive of said roll means as the machine moves along a field.

4. The hay rolling machine according to claim 3 in which said drive means is operable to move the periphery of said roll means at a speed in excess of the ground speed of said machine and thereby facilitate compacting the roll of hay and the like being formed.

5. The hay rolling machine according to claim 1 in which said means to support said roll means comprises auxiliary frame means extending upward from opposite sides of said frame in transverse alignment with each other, link means pivotally supported by the upper portions of said auxiliary frame means and suspended downward therefrom by gravity, shaft means on the ends of said roll means, and bearings in the outer ends of said link means respectively receiving said shaft means on the ends of said roll means.

6. The hay rolling machine according to claim 5 further including drive chain means interconnecting said roll means with at least one of said wheels on said frame and operable to drive the roll means in a direction to move the periphery thereof in the same direction as said roll of hay and the like is being rolled to facilitate rolling and compacting said roll of hay and the like.

7. The hay rolling machine according to claim 6 in which said roll means has circumferentially spaced radially extending rib means disposed longitudinally thereon to facilitate rolling said roll of hay and the like along a field.

8. The hay rolling machine according to claim 5 in which the length of said link means is sufficient to dispose the periphery of said roll means spaced a short distance above the surface of a field from which hay and the like is being formed into rolls by said machine when said roll means is depending from said links in the lowermost position thereof, and drive means connected to said roll means and operable as said machine moves along a field to rotate said roll means positively in a direction to move the periphery thereof in the direction of movement of said machine whereby said roll means is adapted to facilitate the starting of a roll of hay and the like by said machine as it moves along a field.

9. The hay rolling machine according to claim 8 further including chain drive means interconnecting said roll means with at least one of the wheels of said machine to drive said roll means positively as said machine moves along a field.

10. The hay rolling machine according to claim 5 in which said hay roll comprises a shaft, a plurality of disc-like members spaced therealong and fixed transversely thereto, and a plurality of channel members extending in parallel relation to said shaft and circumferentially spaced evenly around the periphery of said disc-like members and fixed thereto, siad channel members opening outwardly on said hay roll to render the flanges thereof operable to effectively engage a roll of hay and also brace said channels against flexing incident to compacting a roll of hay.

11. The hay rolling machine according to claim 1 in which said hay rolling means comprises a series of elongated loops of flexible endless members having fingers thereon and normally extending substantially vertically and spaced transversely apart across the normally rearward portion of said frame, elevated means on the sides of said frame, side members adjacent opposite sides of said frame pivotally connected at one end to said elevated means, transverse supporting means extending between said side members to support said series of flexible endless members, means to drive said series of flexible member in a direction to roll a swath of hay in the direction of movement of said machine, and power means connected to said side members and operable to pivotally elevate said members and the flexible endless members carried thereby relative to the rear end of said frame to a height adequate to permit a roll of hay to pass therebeneath when formed to a desired diameter.

12. The hay rolling machine according to claim 11 in which said transverse supporting means are horizontal shafts supporting circular means around which said flexible endless members extend, and drive means interconnecting one of said shafts to at least one of said wheels of said machine to drive said flexible members when said machine moves along a field.

13. The hay rolling machine according to claim 11 in which the lower ends of said elongated loops of said flexible endless members are adjacent the ground in use, whereby when a roll of hay is initially being formed said compressing roll means initially is near and forwardly of said lower ends of said loops of flexible endless members, and drive means connected between said roll means and at least one of said wheels to drive said roll means in a direction for the periphery thereof to move in the rolling direction of a roll of hay engaged thereby, and thereby augment the formation of a roll of hay by said endless flexible members.

14. The hay rolling machine according to claim 13 in which said drive means for said roll means is operable to drive the same at a peripheral surface speed slightly greater than the speed of said flexible endless members.

* * * * *